LEAD FEED MECHANISM

Filed Dec. 6, 1957 10 Sheets-Sheet 1

INVENTORS
WILLIAM LEROY REITER
GLENN A. MACIEJEWSKI
JAMES M. CALEHUFF
BY Michael Hertz
ATTORNEY INVENTORS
WILLIAM LEROY REITER
GLENN A. MACIEJEWSKI
JAMES M. CALEHUFF
BY Michael Hertz,
ATTORNEY April 4, 1961 J. M. CALEHUFF ET AL 2,977,717

LEAD FEED MECHANISM

Filed Dec. 6, 1957 10 Sheets-Sheet 3

INVENTORS
WILLIAM LEROY REITER
GLENN A. MACIEJEWSKI
JAMES M. CALEHUFF
BY Michael Hertz,
ATTORNEY INVENTORS
WILLIAM LEROY REITER
GLENN A. MACIEJEWSKI
JAMES M. CALEHUFF
BY Michael Hertz
ATTORNEY April 4, 1961 J. M. CALEHUFF ET AL 2,977,717

LEAD FEED MECHANISM

Filed Dec. 6, 1957 10 Sheets-Sheet 5

INVENTORS
WILLIAM LEROY REITER
GLENN A. MACIEJEWSKI
JAMES M. CALEHUFF

BY Michael Hertz,
ATTORNEY

INVENTORS
WILLIAM LEROY REITER
GLENN A. MACIEJEWSKI
JAMES M. CALEHUFF
BY Michael Hertz
ATTORNEY

LEAD FEED MECHANISM

Filed Dec. 6, 1957 10 Sheets-Sheet 7

INVENTORS
WILLIAM LEROY REITER
GLENN A. MACIEJEWSKI
JAMES M. CALEHUFF
BY Michael Hertz,
ATTORNEY

LEAD FEED MECHANISM

INVENTORS
WILLIAM LEROY REITER
GLENN A. MACIEJEWSKI
JAMES M. CALEHUFF
BY Michael Hertz,
ATTORNEY April 4, 1961 J. M. CALEHUFF ET AL 2,977,717

LEAD FEED MECHANISM

Filed Dec. 6, 1957 10 Sheets-Sheet 9

INVENTORS
WILLIAM LEROY REITER
GLENN A. MACIEJEWSKI
JAMES M. CALEHUFF
BY Michael Hertz,
ATTORNEY INVENTORS
WILLIAM LEROY REITER
GLENN A. MACIEJEWSKI
JAMES M. CALEHUFF
BY Michael Hertz
ATTORNEY United States Patent Office 2,977,717

Patented Apr. 4, 1961

2,977,717

LEAD FEED MECHANISM

James M. Calehuff, Montoursville, Glenn A. Maciejewski, Hughesville, and William L. Reiter, South Williamsport, Pa., assignors, by mesne assignments, to Sylvania Electric Products Inc., Wilmington, Del., a corporation of Delaware Filed Dec. 6, 1957, Ser. No. 701,697

17 Claims. (Cl. 49—2)

The invention relates to feeding of a wire or wires to a molten mass of glass on a spindle of a glass stem making machine such as is utilized in the manufacture of electron tubes, and molding the glass about the wires.

In the manufacture of some types of electron tubes, one of the processes involves the formation of a glass base for the bulb portion of the tube, the base having some leads extending therethrough to form lead-in conductors for electrodes within the tube and other or dummy pins extending only upwardly from the base to act as additional support members. It is to the mechanism which effects addition of the leads or pins to the glass base and the preparation of the machine for a final press operation that this invention is directed.

In normal manufacture of a glass stem, i.e., a glass base with leads embedded therein, through or terminal leads are placed within suitably spaced vertical holes in a turret-mounted, spindle-supported, mold while the spindle is held against rotation on its axis. Also a collet or short cylinder of glass is placed around the leads and on the spindle mounted, non-rotating mold. The spindle is then set into rotation and the turret indexed from station to station. At various stations fires play upon the glass and leads and adjacent mold portions to soften the glass and cause it to flow about the leads. Then the spindle is momentarily arrested in its rotation at a given angular position and a non-rotating press head is brought down to preliminarily shape the glass stem on the mold. At a subsequent station the stem is subjected to another press while both the bottom mold and another press head located at that station are non-rotating. In accordance with the teachings of this invention a mold mounted in the head and a mold on the spindle do rotate together at said subsequent station to press the stem, but the head mold is arrested while separated from the lower mold and while the head mold is so held leads or dummy pins are inserted in the head. Then the head moves toward the spindle carried mold to insert the leads or pins therein and while so moving the head mold is set into synchronized rotation with the lower mold. Continued approach movement of the head toward the lower mold effects a press operation on the stem. After head retraction, the referred to spindle mounted mold is indexed to cause the stem to pass through tempering flames, cooling gases and so on, as is conventional in the art. Finally, spindle rotation is arrested and the completed stem is removed from the mold and transferred to a receptacle.

It is an object of this invention to provide means for loading dummy pins or leads into the upper press mold while the same is temporarily held against rotation.

Another object of the invention is to provide means for feeding dummy pins or leads into a glass stem at the final press position of the machine.

A further object of the invention is to provide means for checking the pins or leads to be fed into the press mold to be sure that an appropriate number of them will be fed to the mold.

These and other objects will be made clear upon a consideration of the following specification when taken in conjunction with the accompanying drawing in which.

Although the description exemplifies the invention as operating on dummy pins, it is to be understood that the invention contemplates operation of the novel machine on any slender object similar to a dummy pin or a lead.

Figure 1:
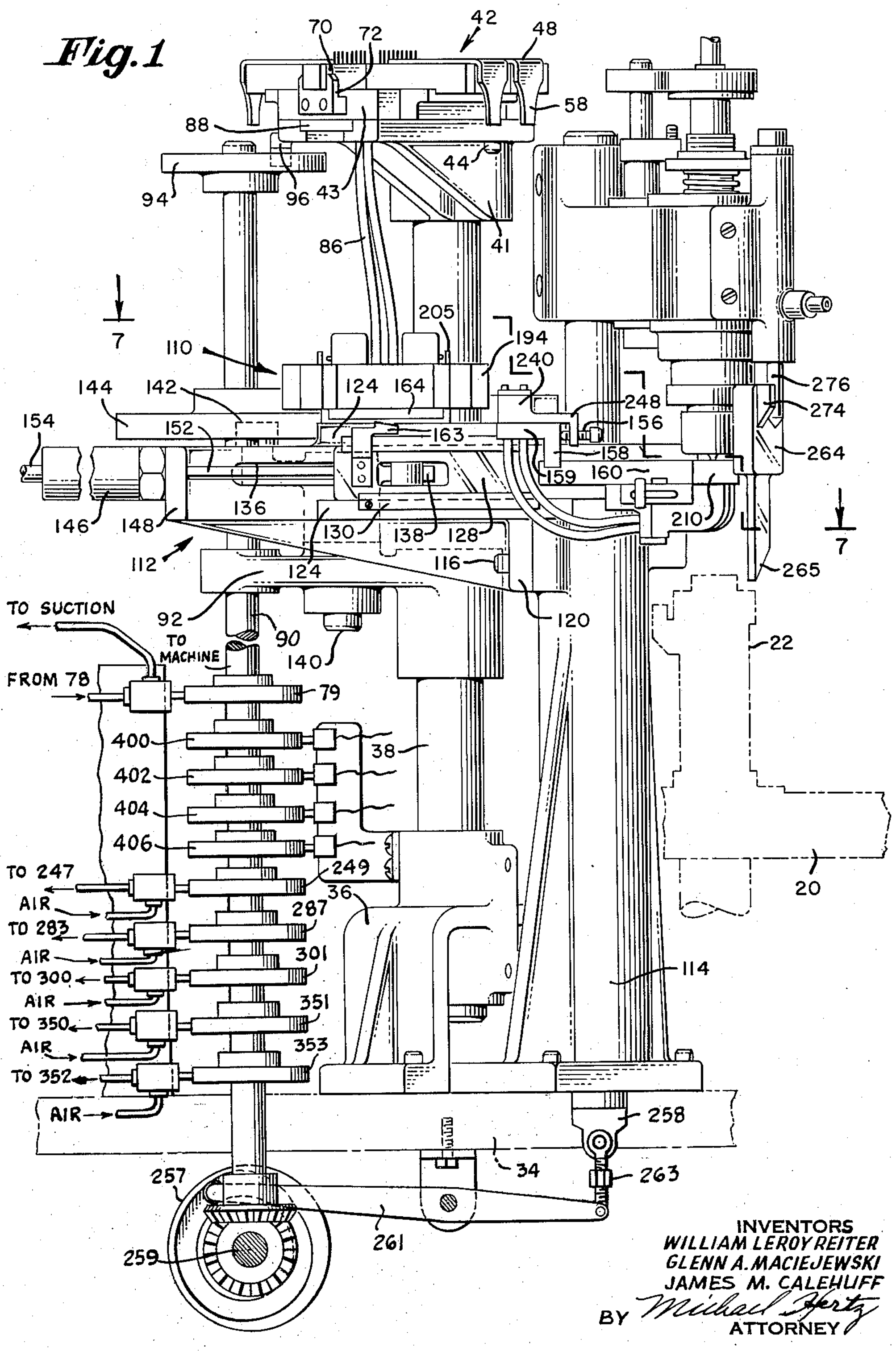
Fig. 1 is a side elevation of mechanism at a dummy pin feed station of the machine.
Figure 15:
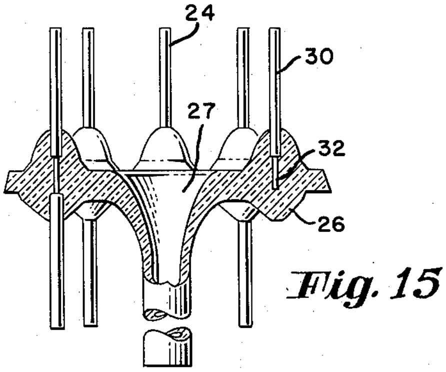
Fig. 15 is a cross sectional view through a glass stem made in accordance with this invention.
Figure 14:
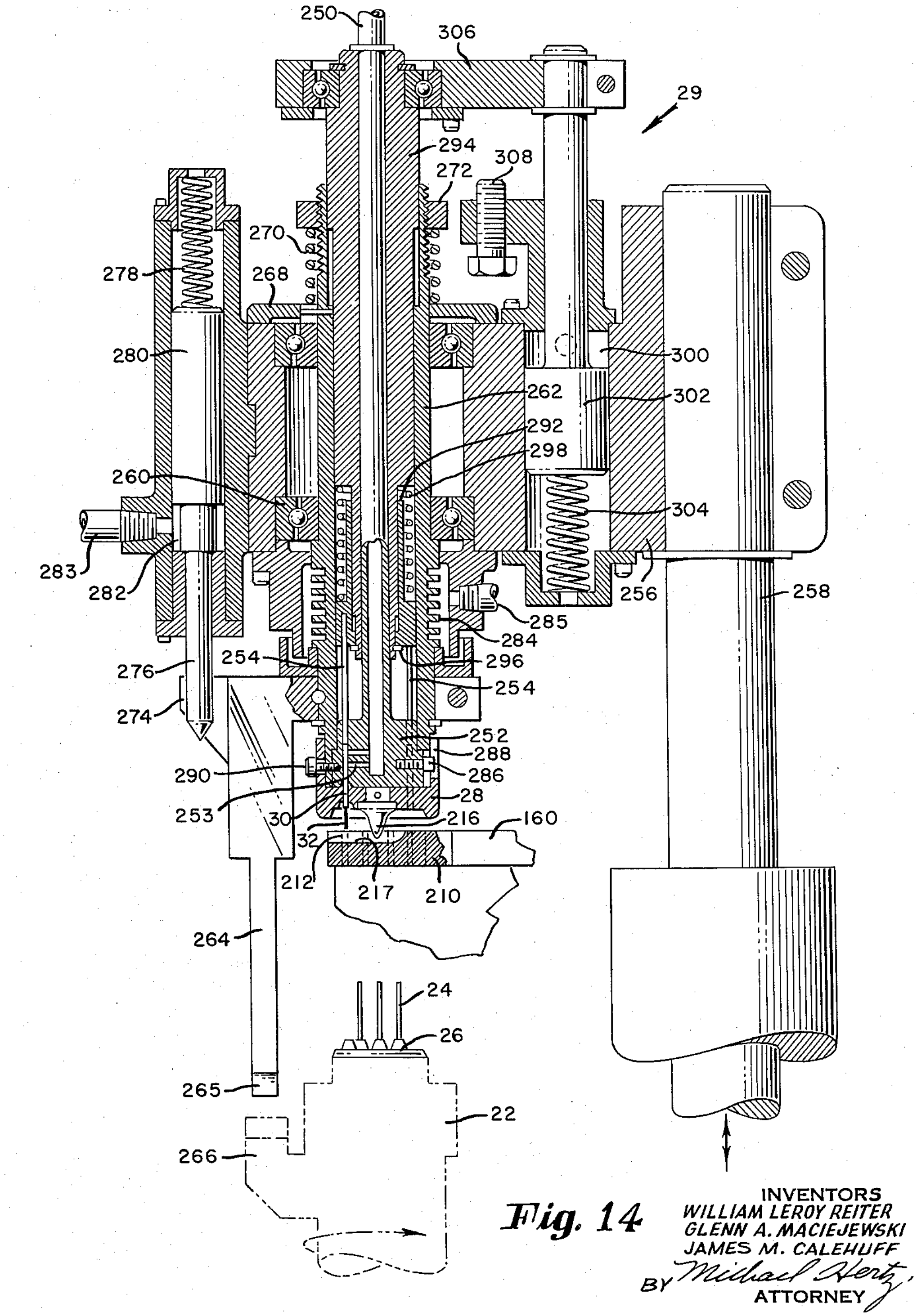
Fig. 14 is a sectional view of the press unit to which the dummy pins are delivered and taken substantially on the line 14—14 of Fig. 2.

Referring to the drawings in greater detail, at 20, Fig. 1, there is indicated the indexible turret of a stem molding machine, said turret having circumferentially spaced spindles 22, Fig. 14, in the upper ends of which are dies adapted to accommodate the leads 24 and glass 26 of a wafer stem, as is conventional in the art. The stem also usually has a central depression as indicated at 27. The stem 24—26 at the illustrated station of Fig. 14 has already been preliminarily formed at a previous press station and is in indexed position for receiving, while rotating, the dummy pins and a second and final press. At this station the glass is maintained in plastic condition by fires, as is conventional in the art, so that the insertion of the dummy pin and the second press operation may be effected. Within the upper press mold 28 of the press head 29 is shown a dummy pin 30 of which the lower reduced end 32 and immediately adjacent part is to be embedded in the glass 26, as shown in Fig. 15.

Figure 2:
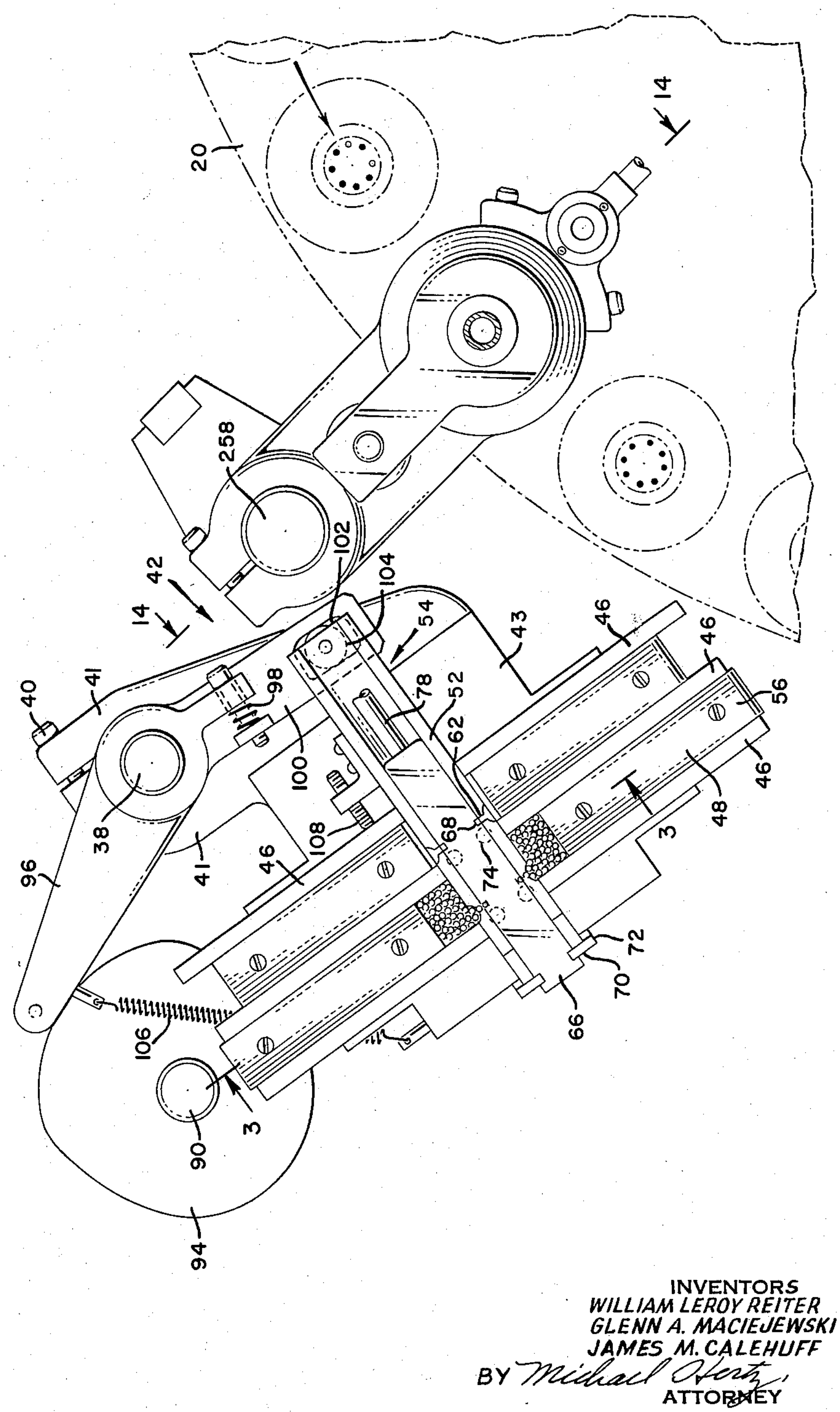
Fig. 2 is a plan view of the machine at that station.
Figure 5:
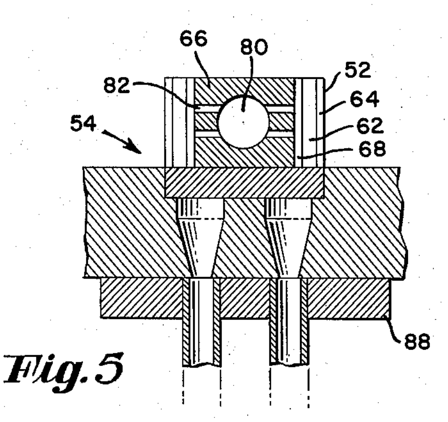
Fig. 5 is a section with vertically offset planes taken transversely through Fig. 4 on the line 5—5, with pin retaining openings in a feed slide in non-communicating relation with discharge ducts.
Figure 4:
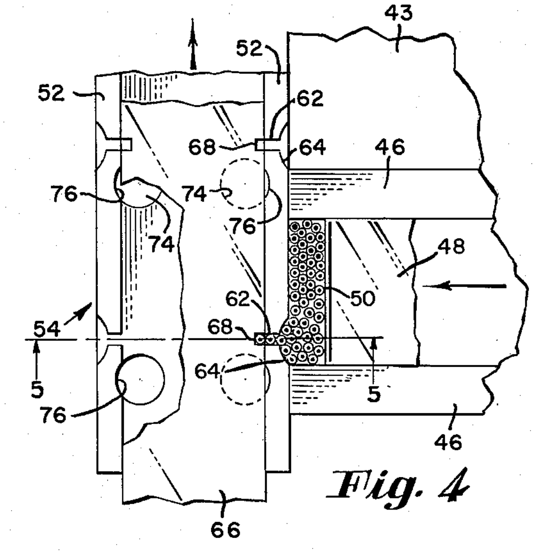
Fig. 4 is an enlarged view of a portion of Fig. 2 with parts broken away to expose underlying parts.
Figure 6:
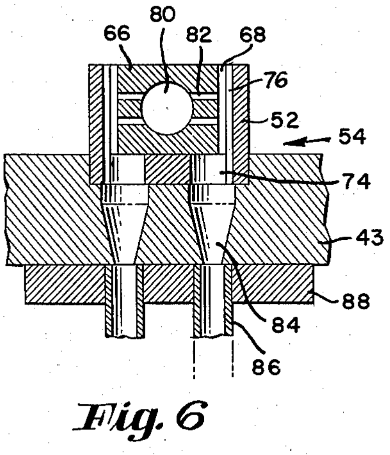
Fig. 6 is a similar section wherein the feed slide openings are shown in communication with the ducts.
Figure 3:
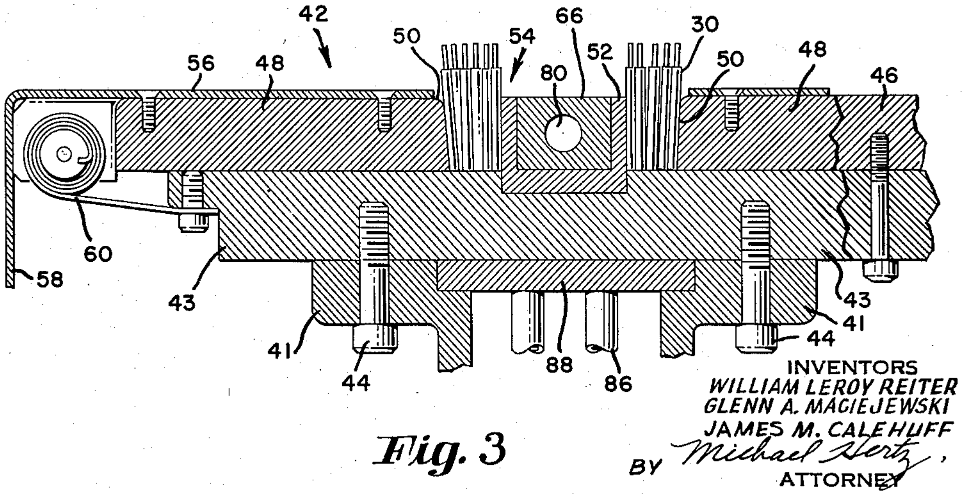
Fig. 3 is a section on the line 3—3 of Fig. 2.

The means for effecting transfer of a pin to the upper press mold 28 from the supply of dummy pins will now be described. Referring to Fig. 1, underneath the turret 20 is a table 34 on which is mounted an angled bracket 36 rigidly clamping a post 38. Secured to the upper end of the post, as by means of a clamp screw 40, see Fig. 2, is a base 41 of a dummy pin dispenser 42. The base 41 has fastened thereto a bed plate 43 as by screws 44, Figs. 1 and 3, this bed plate having fixedly mounted thereon a parallel series of rails 46 forming channels, with base plate 43 as the bottom and the rails 46 as the sides. Slidable in the channels are pusher bars 48, each having a pin engaging end or nose 50, see Figs. 3 and 4. This nose is slightly inclined from the vertical to provide a wider space between bar 48 and a slotted vertical wall 52 at the top than at the bottom. The wall 52 forms part of a reciprocatory channel feed slide 54. Each pusher bar is resiliently held against the dummy pins through the intermediary of a plate 56 screwed onto the top of the bar 48 and provided with a finger operated tail piece 58, said tail piece housing a coil spring 60 having one end fastened within the tail piece by hooking into a slotted washer, the washer being fixed with respect to the plate 56, as seen in Fig. 3, and the other end fastened to the bed plate 43 by a screw threaded into the bed plate. The spring is coiled tight and under strain when the finger piece 58 is moved away from the bed plate, and uncoils and moves the slide to the right, Fig. 3, when the finger piece is released. The spring thus crowds the dummy pins in toward the vertical wall of the reciprocating slide 54 and may be retracted from the wall for insertion of additional pins by pulling on the finger piece 58 in opposition to the action of the spring. The inclined nose 50 is an aid in the alignment of the pins and in thrusting the pins into a vertical slot 62, which extends from the top of the wall 52 down to the floor or web portion of the channel forming the slide 54. As the slide 54 is reciprocated, a pin will be crowded into the slot, there being an arcuate mouth 64 for the slot, see Fig. 4, to assist this action. Within the channel of the pin feed slide 54 is an immovable bar 66 provided with vertical slots 68 each registering with a slot 62 in the channel slide in one of the extreme positions of the slide, as shown in Figs. 2 and 4. In the reciprocation of the slide, the pins will be transferred from a slot in the side wall 52 of the slide 54 to one in the fixed bar 66. The bar 66, see Figs. 1 and 2, is held against movement by reason of side grooves 70 at its forward end engaging in between the tines of a forked plate 72 fastened to the bed plate. Now referring to Figs. 4 and 6, the bottom web of the reciprocating slide is provided with apertures 74, each of which will register with a slot in the fixed bar in the other extreme position of the slide, i.e., when the slide is shifted in the direction of the arrow in Fig. 4 from the position shown therein. It will be appreciated that the holes in the bottom web of the slide and the slots 62 in the side walls thereof move together and that it requires a complete back and forth cycle of the slide to transfer a dummy pin from the bundle of pins to a position where it may drop down through a hole 74 in the slide. Also where the pins drop down through the holes, the inner faces of the walls 52 and the underlying web portion of the slide are provided with recesses 76 to facilitate pin movement.

If desired, suction means may be applied via a conduit 78 (see Fig. 2), under control of a conventional cam 79 and valve, to a manifold 80 in the bar 66 and to ducts 82 leading to the slots 68, this suction means being cut off when it is desired to allow the pins in slots 68 to drop through the holes 74 and through downwardly tapering holes 84 in the bed plate 43. These holes lead to ducts 86 whose upper ends terminate fixedly in a locating plate 88, see Fig. 3, fastened in between the base 41 and the plate 43. The slide 54 is reciprocated by means of a vertical drive shaft 90, Fig. 2, mounted in a casting 92, Fig. 1, fastened on the post 38, said drive shaft having fixed at its upper end a cam 94 serving to shift one arm of a first class lever 96 pivoted on the post 38 and whose other end is drivingly connected via a spring 98 with a drive arm 100 also pivoted on post 38. The free end of the arm 100 has a slot 102 therein engaging a roller 104 rotatable on a pin extending downwardly from slide 54. A spring 106 stretched between the lever and a fixed part of the machine maintains the lever 96 against its cam. The motion of the slide to the position shown in Fig. 2 wherein registration is effected between slots 62 and 68 is limited by a stop 108 engaging a rail 46, the spring 98, after stop engagement with the rail, merely compressing as the cam 94 further moves the lever.

Figures 11, 12:
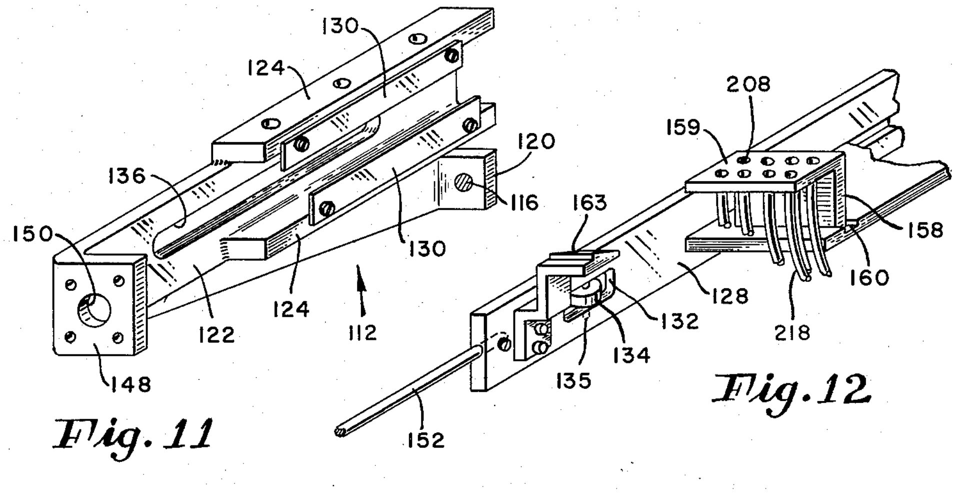
Fig. 11 is a perspective view of a way forming part of the combined checker and transfer unit, parts being removed for the sake of clarity.
Fig. 12 is a perspective view of the slide movable in the way, parts being removed for the sake of clarity.

The ducts 86 lead to a dummy pin checker and transfer unit 110. The unit comprises a base 112, see Figs. 1, 7 and 11, bolted to the upper end of a hollow standard 114 as by bolts 116 passing through an ear or ears 120 on the casting. The casting is provided with a slide way in the form of a channel having a web 122 and two flanges 124, which flanges are shorter than the web. Reciprocatable between the flanges is a slide 128, see Figs. 1, 7 8 and 12, bearing against the web 122 and retained in between the flanges by plates 130 screwed onto the flanges. The slide is provided with a through recess 132 in which is rotatable an antifriction roller 134 mounted on a vertical axle 135 secured within the slide. The web 122 is provided with a slot 136 extending throughout a length at least as long as the stroke of the slide, and extending through the slot and operating on the roller is the end of one arm of a lever 138, see Figs. 1 and 7, pivoted on a shaft 140 fixed in the casting 92. The lever 138 has a second arm provided with an antifriction roller 142 coacting with a cam 144 fixed on the shaft 90. Rotation of the cam thus effects shifting of the slide 128 to the left in Figs. 1 and 7. Movement of the slide to the right in these figures is effected by a piston in a compression chamber motor 146 which is attached to an ear 148 on the casting 112, the ear being provided with suitable bolt holes for fastening on to it the end cap of the motor and with an opening 150, Fig. 11, for passage therethrough of the motor piston rod 152. The right hand end of the piston rod is suitably anchored to the slide 128. The compression motor is fed with compressed air as needed via a conduit 154. Thus the slide is moved to the left against compression in the motor by cam action and is moved to the right by expansion of the air within the compression motor. An adjustable stop 156, Figs. 1 and 7, mounted on a fixed portion of the machine, engages a vertical wall 158 provided with a cantilevered face plate 159, said wall being fixed for movement with a slide ledge 160 to precisely limit the motion of slide 128 to the right. The ledge is secured to the slide by positioning an edge thereof in a groove 161 (Fig. 7) in the slide and held to the slide by screws 162. The slide carries, in addition to the face plate 159 a test platform 163. Further description of the face plate and platform will follow.

Figure 7:
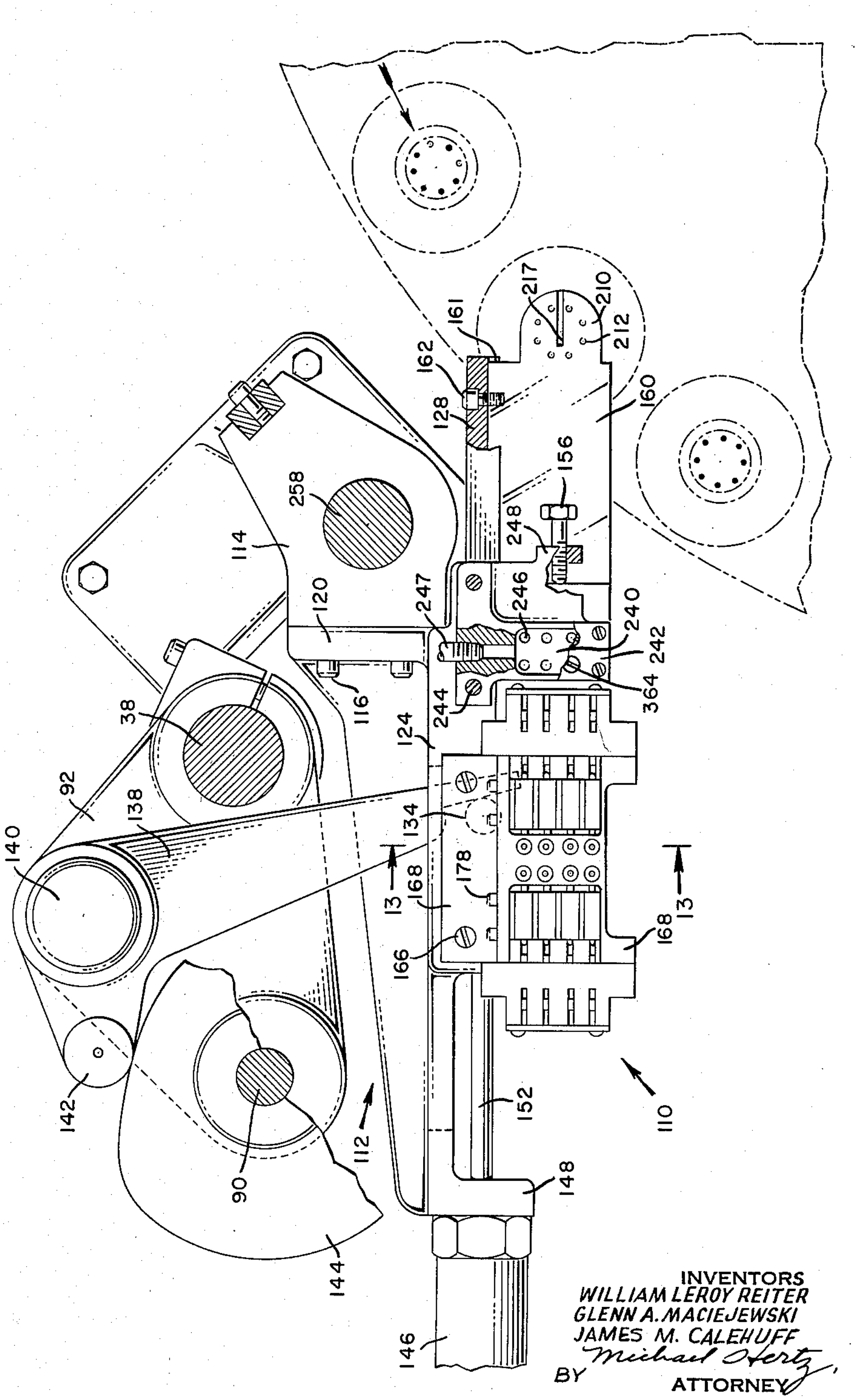
Fig. 7 is a section on the line 7—7 of Fig. 1.
Figures 9, 10:
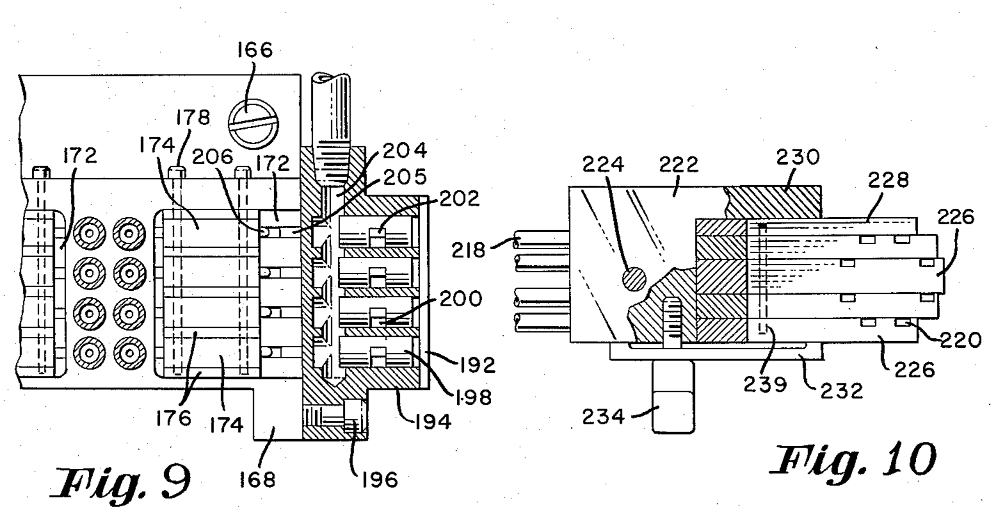
Fig. 9 is a cross section through the checker unit of Fig. 8 on the line 9—9 of Fig. 8.
Fig. 10 is a section taken along the line 10—10 of Fig. 8.
Figure 13:
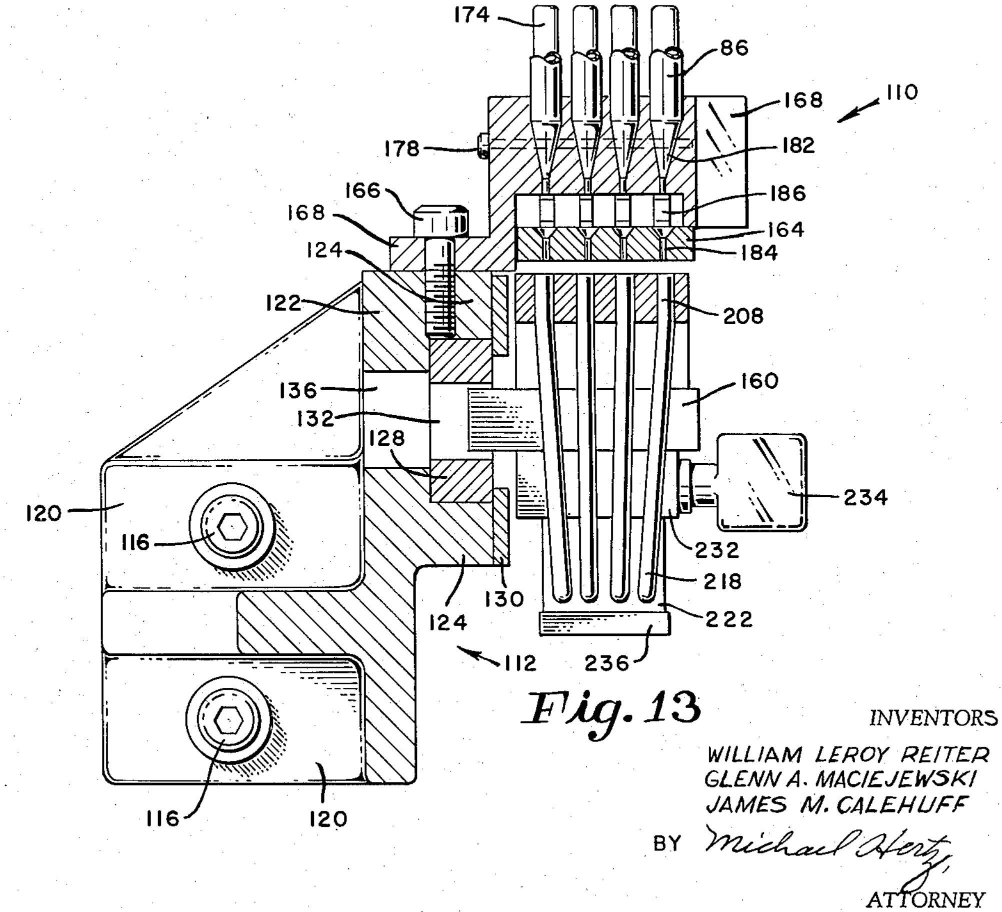
Fig. 13 is a section taken substantially on the line 13—13 of Fig. 7.

On the upper flange 124 of the casting 112, see Figs. 7 and 13, is mounted a block or ledger plate 168, as by means of bolts 166. This ledger plate forms part of the dummy checker portion 110 of the unit. This checker portion, see Figs. 1, 7, 8, 9 and 13 includes the machined block 168 to which is held the perforated plate 164 by screws 170, Fig. 8. Positioned in recessed portions 172 of the upper surface of the black are two groups of normally open micro-switches 174 separated by fiber washers 176 and the parts are held in their positions by pins 178 threaded into the block 168 and passing unthreadedly through aligned holes 180 at the bases of the micro-switches. The ducts 86 from the dummy pin feeding devices terminate in apertures 182 in block 168, these apertures registering with apertures 184 in plate 164. There is a vertical spacing between the block portion in which the apertures 182 are located and the plate 164 to accommodate sensing fingers 186. Each finger is spring urged toward a dividing and dummy pin guiding wall 188 by a spring 190 reacting between the finger and a plate 192 mounted on the side of a multi-piston fluid motor casing 194 attached to the block 168 by screws 196. Within this casing is a multiplicity of pistons 198, each slotted as at 200 to accommodate an upstanding arm 202 on the finger. A manifold 204 communicates with each of the motor pistons of a group and when fluid pressure is admitted to the manifold all of the fingers will be withdrawn in a direction away from the wall 188, against the action of the springs 190. There is a switch operating arm 205 on each of the fingers which is operative on the switch actuating plunger 206 of the micro-switch so that when pressed in, the switch will be closed. When the slide 128 is in the position shown in Fig. 1, the platform 163 is directly below the apertures 184 in plate 164 and will arrest any dummy pins fed down into the checker via the ducts 86. The pins will thus come to rest spanning the gaps between plate 164 and block 168 and which are traversed by the sensing fingers. If, now, pressure in the manifolds be relieved, the springs 190 will function to advance the fingers into contact with the pins but such movement will be insufficient to activate any of the micro-switch plungers. Should a dummy pin be absent, the associated micro-switch plunger will be pressed to switch closed position and a control circuit established to prevent press head operation and to effect dumping of any pins in the checker, as will be explained. All of the switches are connected in parallel so that closure of any one of them will effect closure of the control circuit. If it is desired not to feed a dummy pin to any position, the corresponding flexible duct 86 may be removed from its hole 182 and a plug of sufficient height to span the gap traversed by the sensing finger is inserted into the hole 182. The wall 188 aids in guiding any pin through the checker. The dumping of an incomplete number of pins in the checker is effected by applying fluid pressure to manifold 204 via an electromagnetically controlled slow closing valve in the control circuit, as explained later in connection with Fig. 19, which valve communicates directly with the fluid pressure. Thus during the time the slide is moving from the position shown in Fig. 1 to the position shown in Fig. 8, the pins will be released from the sensing fingers by application of fluid pressure to the pistons and the pins will be free to fall through the openings 184 in the plate 164 when the platform 163 moves away from underneath the openings. On the other hand, with the normal complement of dummy pins in the checker, the pins will be held in the checker until the face plate 159 is beneath the checker block and then fluid pressure will be applied to the manifolds under control of a cam on the machine, as will be explained in connection with Fig. 19, to effect release of the pins. To prevent undesired movement of the pins during the removal of the platform 163, the top of the platform is tapered toward the free end so that in normal operation, as soon as the platform starts to move to the left, a gap appears between the bottom of the pins and the top of the platform and no rubbing action of the platform against the pins takes place.

The slide is retracted against the action of motor 146 by the lever 138 a distance such that when the test platform 163 is withdrawn from beneath the apertures 184, the face plate 159 will be substituted. This face plate is provided with a series of ports 208 registering with the apertures 184 when the slide is in the position shown in Fig. 8, to receive the pins when they are released by retraction of the sensing fingers 186.

Figure 8:
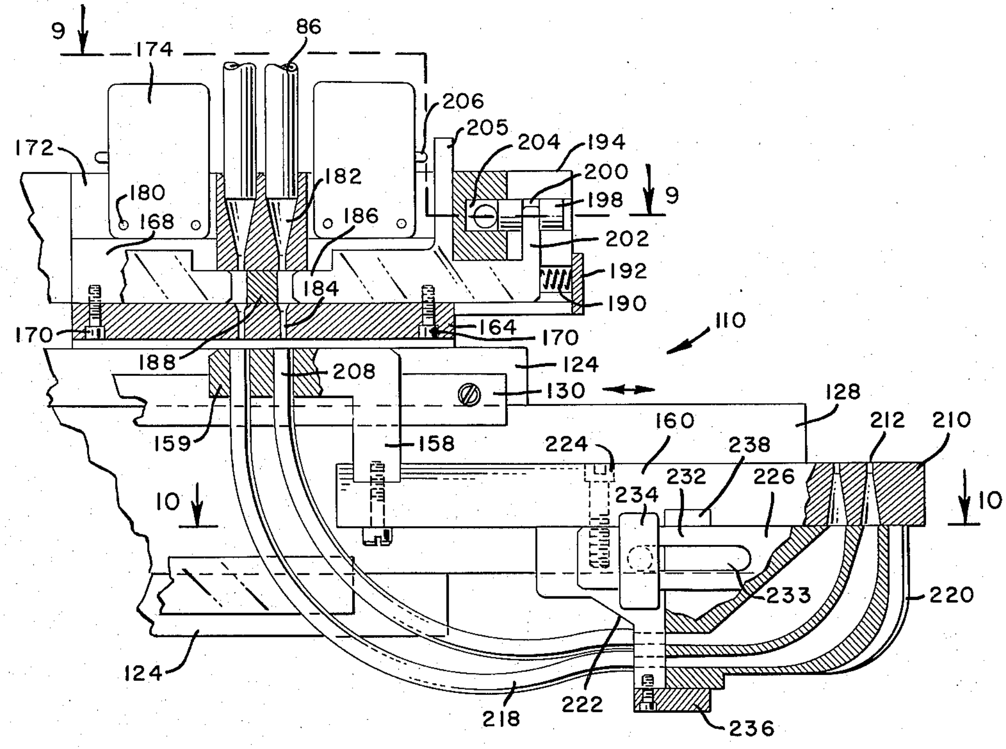
Fig. 8 is a view of the mechanism below the pin feed-in mechanism showing, partly in section, a combined pin checker and delivery unit.

The ledge 160 at its right hand end, see Figs. 7 and 8, is formed into an arcuate pin discharger 210 having perforations 212 therethrough, adapted in the positions of Fig. 7 and Fig. 1 to register with pin receiving openings in the press head 29, see Fig. 14. Since the press head has a nib 216 at its lower end to form the central depression 27 in the glass 26 and the discharger is close below the press head, the discharger is provided with a central longitudinal shallow recess 217 to straddle the nib so that the discharger may move to appropriate registering position beneath the press head. Connecting the ports 208 and perforations 212 are a series of conduits 218 and channels 220. The conduits each communicate at one end with a port 208 and at the other end with a ported block 222 held to the ledge 160 by screws 224. Butted up against the side of ported block 222 opposite to the conduits 218 is a series of channeled plates 226, see Figs. 8 and 10, the channels in the last plate being covered by a cover plate 228. Each of the channels in these plates communicates via a port in block 222 with a conduit 218. The channels in these plates are curved and widened out intermediate their ends to allow for ease in change of direction of the pins as they are transported from the checker into the openings in the press head. To facilitate cleaning out the channels of pins jammed therein because they are bent or for other reasons, the plates are made easily separable from the block 222 and from each other. For this purpose, the plates are held against a rear cheek 230 of the block 222 by a clamp bar 232 provided with a slot 233. The bar is held against the block and end plate 226 by a thumb screw 234 passing through the slot in the bar and threaded into the block 222. When it is desired to remove the plates, the thumb screw is loosened and the bar 232 (Figs. 8 and 10) slid to the left. The plates 226 and 228 may now be removed from the block. If desired, an additional bridge piece 236 may be screwed to the underside of block 222 to hold parts in assembled relationship. A projection 238 on the ledge 160 overlaps the clamp bar to limit swinging movement of the bar about the thumb screw. The channel plates and end plate may be preliminarily assembled in proper relationship prior to application of the plates to the block by affixing a through pin 239 to the center channel plate and providing the remaining plates with perforations to receive the two exposed ends of the pin.

While the dummy pins are transferred from the checker to the transfer conduits and channels by the action of gravity, they are propelled into the press head, when the discharger 210 is below the press head by combined air pressure behind the pins and suction within the press head at the forward ends of the pins.

To obtain the air pressure, a hollow box 240, see Fig. 7, provided with an access cover plate 242, is mounted on the upper flange 124 of the casting 112, as by means of screws 244. The bottom of the box is provided with perforations 246 registering with the ports 208 when the slide is in the position of Fig. 1. A conduit 247 leading to the box is connected to a source of air under pressure via a valve, controlled by a cam 249 on the machine. In the Fig. 1 position of the slide, the cam opens the valve to admit air pressure behind the pins to drive them up into the press head. The stop 156 previously described is threaded through an outwardly and downwardly extending finger 248 made fast or integral with the box 240.

As stated heretofore, the dummy pins are aided in their movement into the press head by suction means. The press head 29 for this purpose is provided with an axial conduit 250 connected at its upper portion to a source of suction by any convenient means as through a rotary union and flexible hose. The lower end of the conduit is provided with an enlargement 252 provided with ducts 253 communicating with the conduit so that suction may pull the pins 30 through the vertical openings in the head, the combined pressure and suction fluids operating to move the pins against mold clean out plungers 254. The suction in the conduit 250 also serves to hold the dummy pins in the head after withdrawal of the discharger 210 and during a subsequent downward movement of the head to insert the dummy pins into the molten glass stem.

The press head 29 is mounted as a whole by means of a casting 256 on a vertically shiftable post 258 to effect pressing operation and separation of the press molds, For this purpose a cam 257 is mounted on a horizontal shaft 259 geared to the shaft 90, and the cam operates on a lever 261 connected by a link 263 to the lower end of post 258. The casting is provided with roller bearing assemblies 260 rotatably supporting an outer sleeve 262 to the lower end of which is fastened an outwardly and downwardly extending driven finger 264 with a lower bevelled end 265 adapted on the downward movement of the head to be brought in front of a driving finger 266 on the frictionally driven spindle 22, as is known in the art. Therefore, on slight downward movement of the head, the fingers 264 and 266 will be brought into driving relationship and the openings in the press head and spindle brought into registration. To ensure against faster rotation of the sleeve 262 than the spindle, a slight frictional force is applied to the sleeve, through the intermediary of a washer 268 mounted for rotation with the sleeve in any conventional fashion, and pressed against the casting by a spring 170 reacting between the washer and a nut 272 threaded on the upper portion of the sleeve.

Upward movement of the post effects separation of the drive between the driving finger 266 and the driven finger 264 and subsequently brings an ear 274 on the finger 264 to an elevation such that as the sleeve 262 is rotated under the rotational inertia imparted thereto, the ear will be brought into engagement with a conically pointed pin 276 and arrested thereby, thereby arresting rotation of the sleeve. The friction disc 268 will then hold the sleeve in the arrested position. The pin 276 is held in the projected position by a spring 278 acting on a piston 280, and is raised out of engagement with the ear just after pins 30 have been inserted in the head, by admitting fluid pressure to a chamber 282 below the piston via a conduit 283. Air in the chamber is released just prior to the head reaching the fully raised position and after the fingers 264 and 266 have separated. The admission of fluid to the conduit is controlled by a cam 287 on the machine.

The sleeve is finned as at 284 and cooled by a supply of air via pipe 285, as is conventional in the art. The upper mold 28 is held to the sleeve by means of a key 286 in the enlargement 252 and a key slot 288 in the mold. An additional screw 290 passed freely through the upper flanged portion of the mold 28 and through the sleeve is threaded into the enlargement. The screw is driven home after the holes in the mold are properly aligned with those in the enlargement, the key and key way affording only rough adjustment of parts.

The plungers 254 are fixedly mounted in the lower end of an intermediate short sleeve 292 limitedly slidable on the reduced end of an inner reciprocatable and rotatable sleeve 294. The short sleeve is urged downward against a stop ring 296 on the inner sleeve by a spring 298 reacting between the short and inner sleeves. While all three sleeves 262, 292 and 294 and the conduit 250 rotate together, all sleeves are capable of relative vertical motion with respect to one another.

On the initial downward movement of the post 258, the casting 256 and all parts carried thereby will be moved down toward the rotating spindle 22. Before finger 264 has been brought to a level where it may be engaged by the driving fiinger 266, which may also be provided with bevelled faces at its upper end, the plunger 276 had been withdrawn. Therefore during continued downward movement of the head and rotation of the spindle 22, the finger 266 will catch up with the finger 264 and set the outer sleeve 262 and inner parts into rotation. Thus continued registration of the openings in the head and bottom mold is insured so that whatever pins or leads are carried in the head will enter the molten glass at the proper location. Still further downward movement of the head will cause the mold 28 to engage the glass 26 and impart to it a final press. The upper ends of through leads 24 which are in the stem will determine the depth of penetration of the dummy leads into the glass, since the plungers 254 will first engage the upper ends of the through leads and rising in the head as the head comes down cannot press the dummy leads too far down through the glass stem.

On upward movement of the post 258, the fingers 264 and 266 will disengage. Just after this disengagement the fluid pressure in chamber 282 will be relieved allowing the spring 278 to project the conically pointed finger 276 so that it will be projected in the path of rotational movement of finger 264 and at the proper angular position stop the rotation of parts in the head. The washer 268 and the associated parts previously described prevent bouncing back action of the head upon engagement of the shoulder 274 with the pin. To effect clearing out of the openings in the upper mold of any accidentally retained dummy pins or leads, and to clear the mold of debris such as congealed glass, the plungers 254 are moved down through the holes in the mold, after the head has been separated from the bottom mold and before the discharger 210 has been positioned below the upper mold. This movement of the plungers is effected by admission of fluid, under control of a cam 301 on the machine, to a fluid chamber 300 above a piston 302 and against the action of a restoring spring 304, the piston rod of the motor being fast with an arm 306 rotatably supporting the sleeve 294. Downward movement of the sleeve 294 within the outer sleeve 262 causes movement of plungers 254 either by reason of compression of the spring 298 and by reason of direct contact of sleeve 294 with the upper end of short sleeve 292, thereby clearing the openings of extraneous matter. Release of pressure in chamber 300 allows the spring 304 to function, bringing the plungers and associated parts to their upper level. The motion of the plungers is limited by contact of arm 306 with an adjustable stop 308 on the head.

Figure 17:
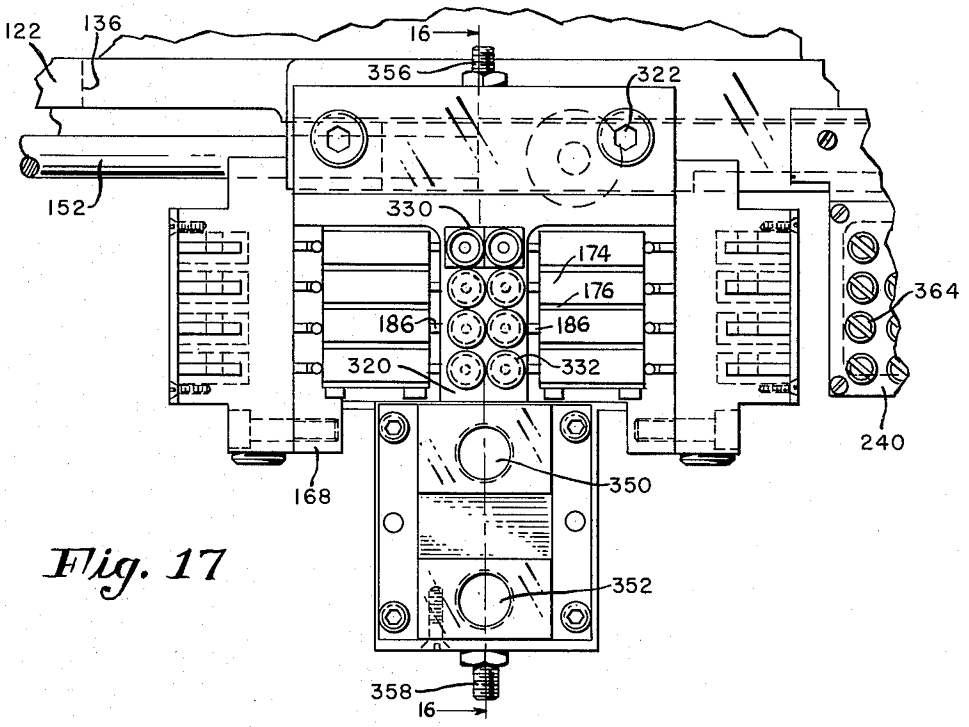
Fig. 17 is a fragmentary plan view of the modified structure shown in Fig. 16.
Figure 16:
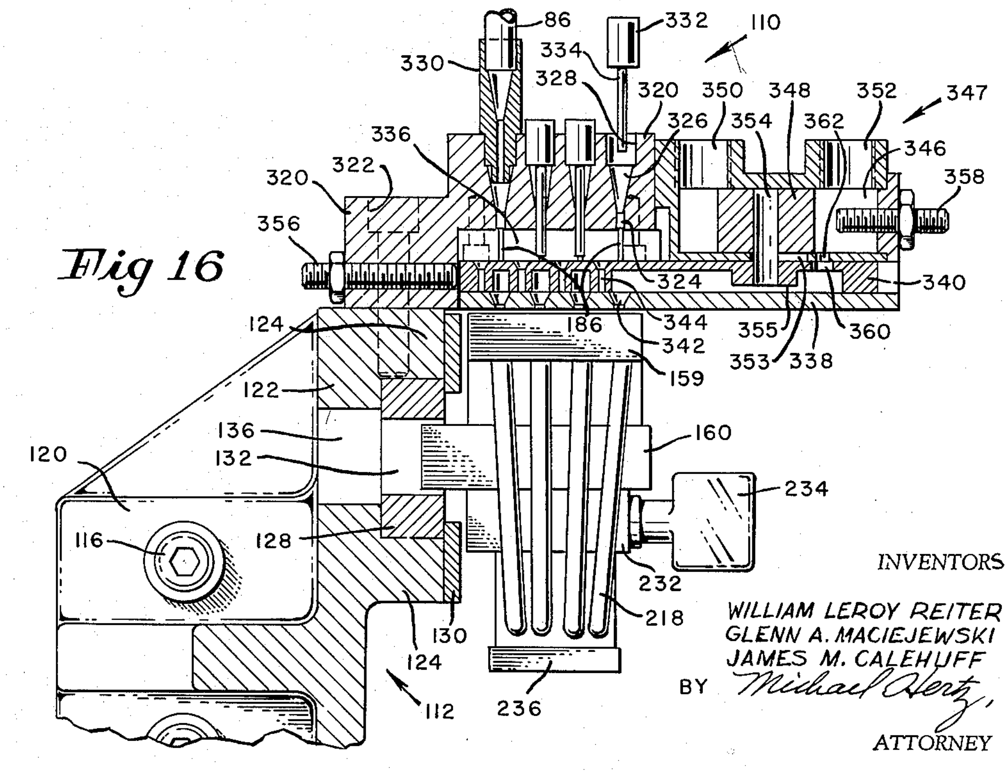
Fig. 16 is a modification of the structure of Fig. 13 and is a mid-vertical section taken on the line 16—16 of Fig. 17.

A modification of the invention is shown in Figs. 16 and 17 wherein the pin stopping platform 163 on the slide is replaced by a pin stop slide valve 340 movable independently of the slide 128 and through only a short distance so as to give a longer dwell for pin feeding and testing.

In the modified form of invention, the upper flange 124 has a block or ledger plate 320 fastened to it by screws 322, this block having funnel like passages including vertical bores 324 which lead to upwardly flaring mouths 326 and which terminate in cylindrical bores 328 adapted to retain either fittings 330 on the ends of ducts 86 or plugs 332 provided with long pins 334 adapted to extend deep enough in a chamber 336 formed in the lower face of block 320 to intercept the sensing fingers associated with the particular bores.

Fastened to the block 320 is the perforated plate 338, this plate being spaced from the level of the bottom of the chamber to provide a way for the recessed slide valve 340. The plate 338 has ports 342 registering with the bores 324 leading into the chamber, and the slide valve has passages 344 therethrough adapted to be shifted into and out of registry with the ports. The valve is shifted by an air motor 346 mounted in a casting 347, said motor having a double acting piston 348 and operated by air supplied through ports 350 and 352, the air being under control of valves operated by cams 351 and 353 in the machine. The motor has its piston connected by a pin 354 to a boss 355 forming part of the hollow slide valve, the pin moving in a slot 353 in the casting. The reciprocating motion of the slide valve is limited by adjustable stops 356 and 358, the stop 356 being engageable with the end of the slide valve and the stop 358 being engageable with the motor piston. The slide valve has a port 360 registering with a port 362 in the motor casing to provide air to blow out the ports 342 in the perforated plate when the transfer slide 128 is moved to bring the discharger 210 beneath the press head and the face plate 159 below the box 240. Also the timing of parts is such that air is still blown through conduits 218 and channels 220 via ports 342 on the return movement of the slide 128 to where face plate 159 is below the plate 338 and prior to release of new dummy leads into the conduits. Where pin delivery conduits are plugged up as by the plugs 332, the corresponding blow out holes in the bottom of the box 240 may be closed off by shut off valves 364 threaded into the cover of the box and engageable with the ports. Otherwise these valves may be unscrewed to lift the valves from hole obstructing positions.

The slide valve 340 is moved to a position in contact with the stop 356 prior to dropping of the pins or leads through the ducts 86.

With the normal complement of pins before the sensing fingers, the slide valve piston 348 will move against stop 358 at any time after the slide 128 has moved to position wherein the plate 159 is beneath the plate 338, thereby enabling the slide valve to have a considerable dwell in passage non-registering position, to give considerable latitude in timing of the pin feed via the ducts 86 and in sensing of the pins by the sensing fingers.

In normal operation, when all pins are present, the sensing fingers will be held retracted while pins drop onto the slide valve and while the slide 128 is moving from its right hand position under the press to its left hand position. The cam 144 which operates the lever 138 to drive the slide to the left is so contoured as to leave the slide at the left for a considerable portion of the cycle. But before the slide moves back to the right the fingers 186 are brought into sensing contact with the pins and again withdrawn by closure of a cam controlled switch, as explained in conjunction with Fig. 19. Then as the slide valve 340 moves to registering position relative to the bores 324 and the ports 342, the pins drop into the conduits in the transfer slide 128.

Figure 19:
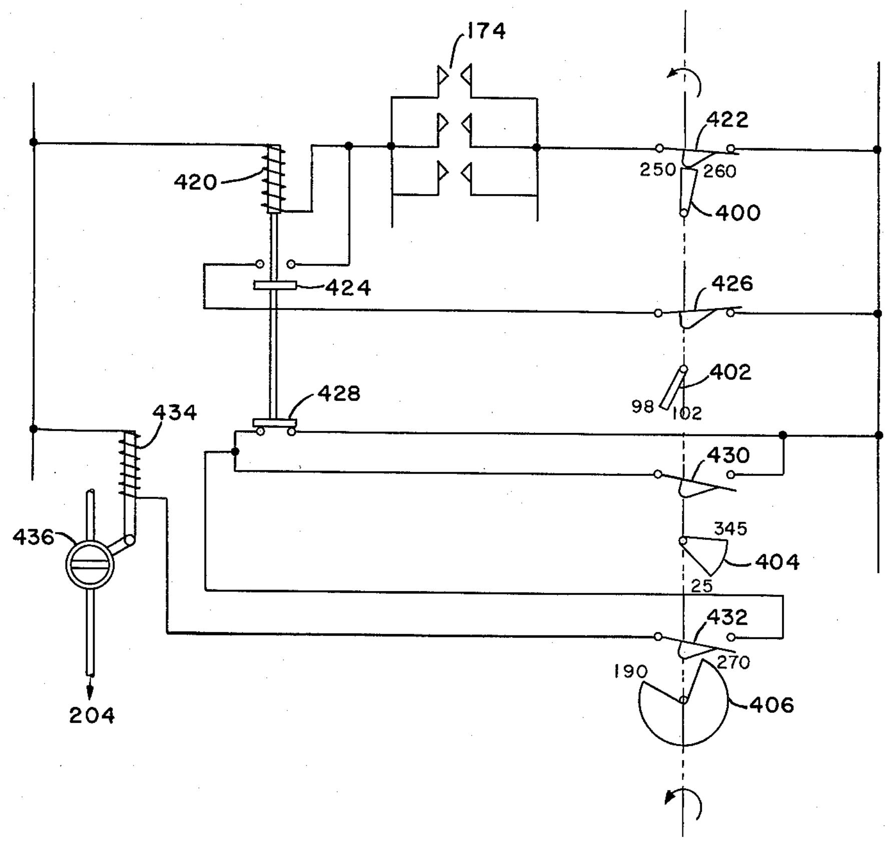
Fig. 19 is a camming and wiring diagram of salient portions of the machine.

In the event of a missing pin, when the pin sensing and holding fingers are permitted to come toward the switches 174, another cam operated switch will be closed causing a retraction of all of the sensing fingers, as explained in conjunction with Fig. 19. These fingers will then be held out long enough to permit dumping of the pins through the slide valve 340 prior to the return of the transfer slide 128 to the left.

Figure 18:
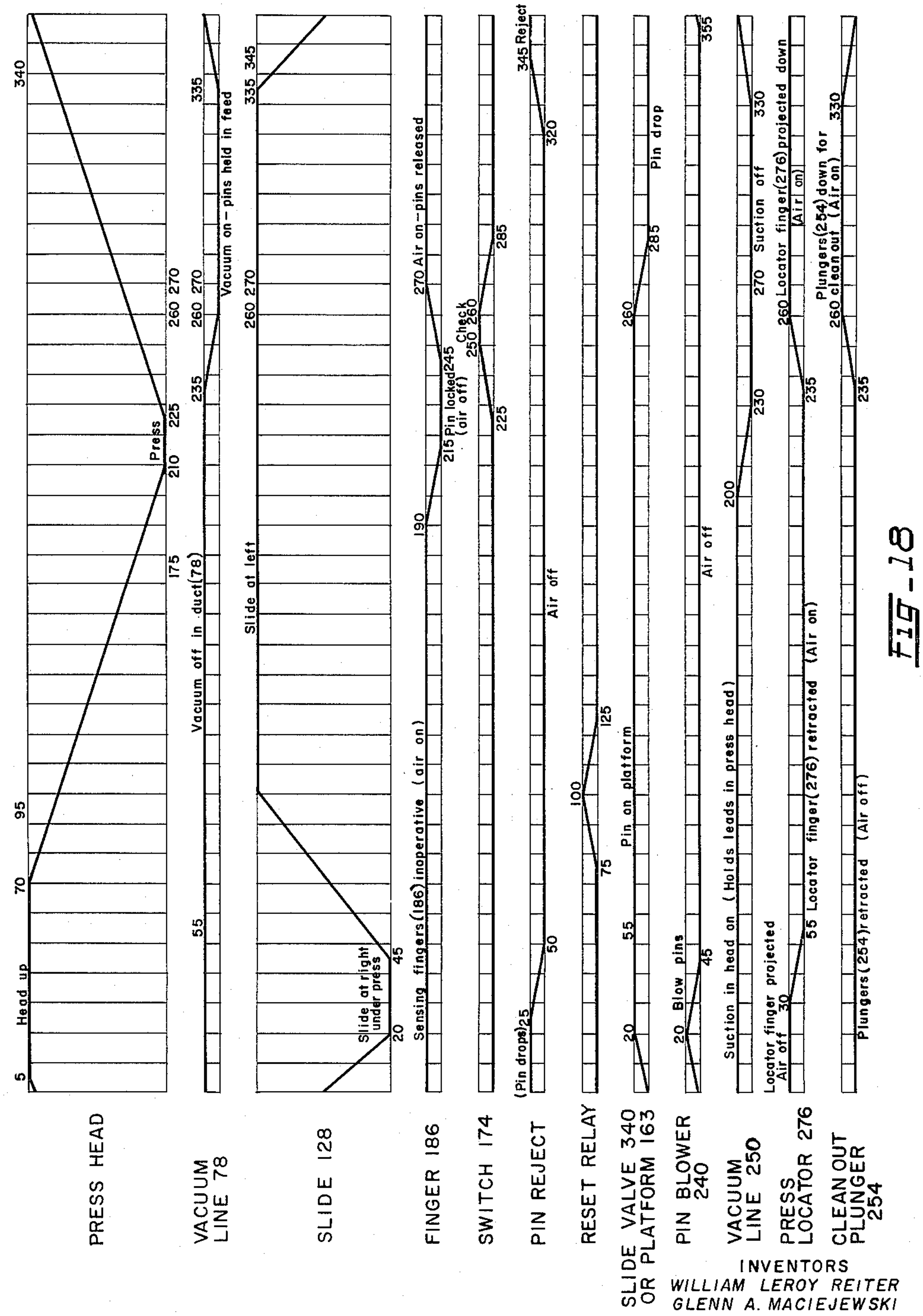
Fig. 18 is a timing diagram showing the relative displacement of parts.

To clarify the action of the sensing fingers and associated parts consider the timing chart of Fig. 18 and the circuit diagram of Fig. 19.

The cams 400, 402, 404 and 406 diagrammatically shown in Fig. 19 are on the cam driving shaft of the machine and synchronized with turret indexing. The extent of the cams and relative locations are as illustrated. These cams operate various switches as will be described.

The switches 174 are in parallel with each other and in series with a self locking relay 420 and a switch 422 operated by cam 400. The relay 420 controls a normally open switch 424 in series with a switch 426 controlled by cam 402. The relay also has a normally closed switch 428 shunted by a switch 430 under control of cam 404 and in series with a switch 432 under control of cam 406. In series with the switches 428 and 432 or in series with the switches 430 and 432 is a solenoid 434, operating a valve 436, this being the valve which controls flow of fluid pressure to the manifolds 204.

If during the cycling of the machine the sensing fingers are arrested by dummy leads or pins and none of the switches 174 is operated, the relay 420 will not be energized. When the cam 406 reaches its 270° position the switch 432 will be closed and the solenoid 434 operated to open the valve leading to manifolds 204 and retract the sensing fingers. At 270° the slide 128 is to the left with the face plate 159 beneath the plate 338 (or beneath the ledger plate 164 in Fig. 8). At that time the vacuum line 78 is "on" preventing any further pins being dropped into the pin checker unit. Also the vacuum in pipe line 250 to the head is "off," so that no dirt will be sucked into the head. The air to the motor chamber 282 for the locator pin 276 in the head is cut off, whereby the pin is projected. Also compressed air is being supplied to chamber 300 in the head to project the clean out plungers 254. In the case of the structure of Fig. 8, the withdrawal of the sensing fingers allows the pins to drop into the conduits 218. In the case of the structure of Figs. 16 and 17, the air motor 346 will at this time be operated to move the slide valve 340 to the right, to allow the pins to drop into the conduits 218. The press head 29 is now being moved up by the cam on the machine which effects lifting of the post 258. As will be remembered from the previous description, when the slide 128 is moved to the right the head is fully up, the suction in the head is "on" to suck up the pins in the transfer slide 128 and the air pressure is "on" in box 240 to assist in removing the pins from the transfer slide and moving them into the head.

In the event of there being a missing pin in the checker unit the apparatus will function as follows: Consider the situation at about 20° in the time chart of Fig. 18. The sensing fingers are withdrawn; the pin feed shortly thereafter (at 55°) will release pins into the checker unit; preceding the dropping of the pins the slide 128 goes to the right (at 20°) with the test platform 163 of Fig. 12 beneath the checker (or the slide 340 of Fig. 16 moves to out of registration position). Again referring to the timing chart, at 215° the fluid to manifolds 204 is cut off and the sensing fingers have moved in and closed a switch 174 due to the absence of a pin. Now referring to Fig. 19, as the cam 400 closes switch 422 a circuit will be completed through switch 174 and relay 420, and contacts 424 will close establishing a holding circuit for the relay through normally closed switch 426. The cam 400 closes the switch 422 at approximately 250° on the timing chart. The circuit to the solenoid 434 however will be broken at switch 428 regardless of the position of switch 432 and therefore the valve 436 to manifolds 204 will be closed; therefore the fingers 186 will not be retracted and the pins which are in the checker unit will be prevented from falling therefrom.

As the cam shaft continues to revolve, the switch 432 will be closed by its cam 406 but the solenoid 434 is still deenergized since both parallel switches 428 and 430 are open. Further rotation of the shaft causes cam 404 to close switch 430 to energize sloenoid 434 and open the valve 436 to cause the sensing fingers to release and move away from any leads in the checker unit which may be there. This takes place at about the 345° angle of rotation of the cam shaft. At this time the platform 163 and the face plate 159 are moving to the right, whereby the pins will be dumped into a receptacle beneath the checker unit; in the case of the structure of Figs. 16 and 17 the slide valve perforations will be in registration with the checker unit perforations while the slide 128 will be to the right, thus effecting dumping of the pins. Continued rotation of the cam shaft causes finger 402 to momentarily open the switch 426, whereby the relay 430 is unlocked and the switch 424 opened while switch 428 is again closed. Since cam 404 soon allows switch 430 to open, the operation of solenoid 434 comes under the normal control of cam 406 and its switch 432.

The showing of the cams and the parts controlled thereby at the lower left-hand portion of Fig. 1 is exemplary only and is not intended to embody the precise construction and location of these parts. The actual timing of the cams and associated parts is indicated in Fig. 18.

What is claimed as new is:

1. In a lead feed mechanism, a transfer unit comprising a shiftable support, means to shift the support, said support having thereon a platform, a ported face plate, and a perforated discharger, all in laterally spaced relationship on the support, a passageway connecting a port in the face plate with a perforation in the discharger, a fixed member mounting the support, a fixed block above the member having a vertical aperture therethrough, means to feed a lead to said vertical aperture while the platform is beneath the aperture, means to engage a lead in the aperture at least during the initial portion of the movement of the platform from underneath the block, the spacing between the platform and face plate and displacement of the support being such as to alternatively bring the platform or the face plate beneath the block, with the aperture in the block in registration with the port in the face plate, means to withdraw the lead engaging means from a lead when said aperture and port are in registration, to permit a lead to drop into the passageway, means to remove a lead from the perforated discharger, and means to synchronize the operation of the various means.

2. In a lead feed mechanism, a transfer unit comprising a shiftable support, means to shift the support, said support having thereon a platform, as well as a ported face plate and a perforated discharger, all in laterally spaced relationship on the support, a passageway connecting a port in the face plate with a perforation in the discharger, a fixed member mounting the support, a fixed block above the member having a vertical aperture therethrough, means to feed a lead to said vertical aperture while the platform is beneath the aperture, means to engage a lead in the aperture at least during the initial portion of the movement of the platform from underneath the block, the spacing between the platform and face plate and displacement of the slide being such as to alternatively bring the platform or the face plate beneath the block, with the aperture in the block in registration with the port in the face plate, means to withdraw the lead engaging means from a lead when said aperture and port are in registration to permit a lead to drop into the passageway, a head in position register with the discharger in one of the positions of the support, said head having a lead receiving opening in the lower end thereof, means to apply suction to said lead receiving opening when the discharger is beneath the head with the perforation and lead receiving opening in alignment, and means to synchronize the various means.

3. In a lead feed mechanism, a transfer unit comprising a laterally reciprocatable slide, said slide having thereon a platform, as well as a ported face plate and a perforated discharger, all in laterally spaced relationship on the slide, means to reciprocate the slide, a passageway connecting a port in the face plate with a perforation in the discharger, a slideway mounting the slide, a fixed block above the slideway having a vertical aperture therethrough, means to feed a lead to said vertical aperture while the platform is beneath the aperture, a box having a perforated bottom spaced laterally from the fixed block a distance equal to the throw of the reciprocatable slide, means to engage a lead in the aperture at least during the initial portion of the movement of the platform from underneath the block, the spacing between the platform and face plate and displacement of the slide being such as to alternatively bring the platform beneath the block or the face plate beneath the block with the aperture in the block in registration with the port in the face plate, means to withdraw the lead engaging means from a lead when the said aperture and port are in registration to permit a lead to drop into the passageway, means to supply said box with fluid under pressure when the perforated bottom of said box is in registration with the ported face plate, and means to synchronize the various means.

4. In a lead feed mechanism, a lead dispenser, a transfer unit having a member with a vertical aperture therethrough, a duct interconnecting the dispenser and the aperture in the member, a slide forming part of the unit having a platform and a face plate mounted thereon in laterally spaced relationship, means for laterally reciprocating the slide for interchangeably bringing the platform and face plate below the aperture, said face plate having a port registering with the aperture when it is below the aperturned member, shiftable means for temporarily engaging a lead in the vertical aperture while the platform is moving out from beneath the member, a lead discharger having a discharge perforation mounted on the slide, a lead conducting passageway between the port in the face plate and the perforation in the discharger, means to effect movement of a lead in the passageway therethrough and out of the discharger, and means to synchronize the various means.

5. In a lead feed mechanism, a lead dispenser, a transfer unit having a member with a vertical aperture therethrough, a duct interconnecting the dispenser and the aperture in the member, a slide forming part of the unit having a platform and a face plate mounted thereon in laterally spaced relationship, means for laterally reciprocating the slide for interchangeably bringing the platform and face plate below the aperture, said face plate having a port registering with the aperture when it is below the apertured member, shiftable means for temporarily engaging a lead in the vertical aperture while the platform is moving out from beneath the member, motor means operative on the shiftable means, switch means controlling the motor means and in the path of the shiftable means to be operated thereby only in the absence of a lead and on movement of the shiftable means in the lead engaging direction, a lead discharger having a discharge perforation mounted on the slide, a lead conducting passageway between the port in the face plate and the perforation in the discharger, means to remove a lead from the perforated discharger, and means to synchronize the operation of the various means.

6. In a lead feed mechanism, a lead dispenser, a transfer unit having a member with vertical apertures therethrough, ducts interconnecting the dispenser and the apertures in the member, a slide forming part of the unit having a platform and a face plate mounted thereon in laterally spaced relationship, means for laterally reciprocating the slide for interchangeably bringing the platform and face plate below the apertures, said face plate having ports registering with the apertures when it is below the apertured member, plural shiftable means for temporarily engaging leads in the vertical apertures while the platform is moving out from beneath the member, switch means in the path of each of the shiftable means, to be operated thereby only in the absence of a lead and on movement of the shiftable means in the lead engaging direction, a mechanism under control of the switch means to effect withdrawal of all of the shiftable means and dumping of all leads upon withdrawal of the platform and prior to positioning of the face plate beneath the block, a lead discharger having discharge perforations mounted on the slide, lead conducting passageways between the ports in the face plate and perforations in the discharger, means to remove a lead from the perforated discharger, and means to synchronize the operation of the various means.

7. In a transfer unit, a laterally reciprocatable slide having thereon a ported face plate and a perforated discharger in lateral spaced relation, means for reciprocating the slide, passageways connecting the ported face plate and perforated discharger, and means for delivering leads into the passageways via the ported face plate, said passageways comprised, in part, of grooves in the faces of the stacked plates, forming channels between the plates, said plates being removable from the discharger and separable from each other to effect cleaning of the grooves, means to remove a lead from the perforated discharger, and means to synchronize the operation of the various means.

8. In a lead feed mechanism, a lead receiving block having a vertical aperture therethrough, a chamber in the lower face of the block with which the aperture communicates, a perforated bottom closing the chamber, with the perforation in the bottom registering with the aperture, a sensing finger slidable in the chamber in the space between the block and bottom, spring means urging the sensing finger toward the aligned aperture and perforation and therebeyond, motor means connected to the sensing finger to withdraw the same, a support with a platform, ported face plate and perforated discharger spaced from each other along the support, a passageway connecting a port in the face plate with a perforation in the discharger, means to alternatively position the platform or face plate beneath the bottom, means to control the motor functioning of the motor means to withdraw the sensing finger when the platform is beneath the bottom and when the ported face plate is beneath the bottom and to allow the spring to function to move the finger against a lead during interchange of platform and ported face plate beneath the perforated chamber covering bottom, means to remove a lead from the perforated discharger, and means to synchronize the operation of the various means.

9. In a lead feed mechanism, a transfer unit comprising a slide, means for reciprocating the slide comprising a compression chamber connected to the slide to move it in one direction and a cam operated lever engaging a follower roller on the slide to move the slide in the opposite direction, said slide having thereon a platform as well as a ported face plate and a perforated discharger, all in laterally spaced relationship on the slide, a passageway connecting a port in the face plate with a perforation in the discharger, a slideway mounting the slide, a fixed block above the slideway having a vertical aperture therethrough, means to feed a lead to said vertical aperture while the platform is beneath the aperture, means to engage a lead in the aperture at least during the initial portion of the movement of the platform from underneath the block, the spacing between the platform and face plate and displacement of the slide being such as to alternatively bring the platform beneath the block or the face plate beneath the block, with the aperture in the block in registration with the port in the face plate, means to withdraw the lead engaging means from a lead when the said aperture and port are in registration, to permit a lead to drop into the passageway, means to remove a lead from the perforated discharger, and means to synchronize the operation of the various means.

10. In a lead feed mechanism, a transfer unit comprising a slide, means for reciprocating the slide comprising a compression chamber connected to the slide to move it in one direction against an adjustable stop, and a cam operated lever engaging a follower roller on the slide to move the slide in the opposite direction, said slide having thereon a platform as well as a ported face plate and a perforated discharger, all in laterally spaced relationship on the slide, a passageway connecting a port in the face plate with a perforation in the discharger, a slideway mounting the slide, a fixed block above the slideway having a vertical aperture therethrough, means to feed a lead to said vertical aperture while the platform is beneath the aperture, means to engage a lead in the aperture at least during the initial portion of the movement of the platform from underneath the block, the spacing between the platform and face plate and displacement of the slide being such as to alternatively bring the platform beneath the block or the face plate beneath the block, with the aperture in the block in registration with the port in the face plate, means to withdraw the lead engaging means from a lead when the said aperture and port are in registration, to permit a lead to drop into the passageway, means to remove a lead from the perforated discharger, and means to synchronize the operation of the various means.

11. In a lead feed mechanism, a transfer unit comprising a shiftable support, means to shift the support, said support having thereon a ported face plate and a perforated discharger in laterally spaced relation thereon, a passageway connecting the port in the face plate and the perforation in the discharger, means for delivering a lead into the passageway via the port in one shifted position of the support, a head having a lead receiving opening in the lower end thereof registerable with the perforation in the discharger in another shifted position of the support, means to effect transfer of a lead from the passageway into the opening in the head when the support is in said another position, and means to synchronize the operation of the various means.

12. In a lead feed mechanism, a transfer unit comprising a shiftable support, means to shift the support from one position to another, said support having thereon a ported face plate and a perforated discharger in laterally spaced relation thereon, a passageway connecting the port in the face plate and the perforation in the discharger, means for delivering a lead into the passageway via the port in one shifted position of the support, a head having a lead receiving opening in the lower end thereof registerable with the perforation in the discharger in another shifted position of the support, and means to effect transfer of a lead from the passageway into the opening in the head when the support is in said another position, said means for delivering a lead into the passageway comprising a block with a vertical aperture therethrough, a perforated ledger plate below the block with its perforation in alignment with the aperture, a slide movable above the ledger plate and below the block having a perforation adapted to be brought into and out of registration with the vertical aperture, means for shifting the slide, and means to synchronize the operation of the various means.

13. In a lead feed mechanism, a transfer unit comprising a shiftable support, means to shift the support, said support having thereon a ported face plate and perforated discharger in laterally spaced relation thereon, a passageway connecting the port in the face plate and the perforation in the discharger, means for delivering a lead into the passageway via the port in one shifted position of the support, a head having a lead receiving opening in the lower end thereof registerable with the perforation in the discharger in another shifted position of the support, and means to effect transfer of a lead from the passageway into the opening in the head when the support is in said another position, said means for delivering a lead into said passageway comprising a block with a vertical aperture therethrough, a perforated plate below the block with its perforation in alignment with the aperture, a hollow open bottomed slide movable above the perforated plate and below the block and having a vertical channel traversing the slide including the hollow, said channel being adapted to be brought into and out of alignment with the vertical aperture, a double acting compressed air motor connected to the slide for shifting the same, one of the chambers of the motor being in communication with the hollow of the slide to enable air to blow through the perforation in the perforated plate when the slide is moved to out of registration position, and means to synchronize the operation of the various means and the air motor.

14. In a lead feed mechanism, a transfer unit comprising a laterally reciprocatable slide, means for reciprocating the slide, said slide having thereon a ported face plate and a perforated discharger in laterally spaced relation thereon, a passageway connecting the port in the face plate and the perforation in the discharger, means for delivering a lead into the passageway via the port in one position of the slide, a head having a lead receiving opening in the lower end thereof registerable with the perforation in the discharger in another position of the slide, means to effect transfer of a lead from the passageway into the opening in the head when the slide is in said another position, and means to synchronize the operation of the various means.

15. In a lead feed mechanism, a transfer unit comprising a laterally reciprocatable slide, means for reciprocating the slide, said slide having thereon a ported face plate and a perforated discharger in laterally spaced relation thereon, a passageway connecting the port in the face plate and the perforation in the discharger, means for delivering a lead into the passageway via the port in one position of the slide, a head having a lead receiving opening in the lower end thereof registerable with the perforation in the discharger in another position of the slide, suction means in the head communicating with said opening to effect transfer of a lead from the passageway via the perforated discharger into the opening in the head when the slide is in said another position, and means to synchronize the operation of the various means.

16. In a lead feed mechanism, a transfer unit comprising a laterally reciprocatable slide, means for reciprocating the slide, said slide having thereon a ported face plate and a perforated discharger in laterally spaced relation thereon, a passageway connecting the port in the face plate and the perforation in the discharger, means for delivering a lead into the passageway via the port in one position of the slide, a head having a lead receiving opening in the lower end thereof registerable with the perforation in the discharger in another position of the slide, means to effect transfer of a lead from the passageway into the opening in the head via the perforated discharger when the slide is in said another position, said last means comprising a box furnished with compressed air and having a perforated bottom positioned above the face plate when the perforation in the discharger is in registration with the head opening, and means to synchronize the operation of the various means.

17. In a lead feed mechanism, a lead receiving block having a vertical aperture therethrough, a chamber in the lower face of the block with which the aperture communicates, a perforated bottom closing the chamber, with the perforation in the bottom registering with the aperture, a sensing finger slidable in the chamber in the space between the block and bottom, a spring urging the sensing finger toward the aligned aperture and perforation and therebeyond, motor means connected to the sensing finger to withdraw the same, a support with a platform, ported face plate and perforated discharger spaced from each other along the support, means to alternatively position the platform or face plate beneath the bottom, a passageway connecting a port in the face plate with a perforation in the discharger, means to control the functioning of the motor means to withdraw the sensing finger when the platform is beneath the bottom and when the ported face plate is beneath the bottom and to allow the spring to function to move the finger against a lead during interchange of platform and ported face plate beneath the perforated chamber covering bottom, means to remove a lead from the perforated discharger, and means to synchronize the operation of the various means.

References Cited in the file of this patent

UNITED STATES PATENTS

| | | |
|---|---|---|
| 1,867,418 | Muller | July 12, 1932 |
| 2,042,520 | Flaws et al. | June 2, 1936 |
| 2,334,653 | Senkbeil | Nov. 16, 1943 |
| 2,336,864 | Holmes | Dec. 14, 1943 |
| 2,398,329 | Rostagno | Apr. 9, 1946 |
| 2,554,982 | Hartley et al. | May 29, 1951 |
| 2,600,052 | Gartner et al. | June 10, 1952 |
| 2,617,556 | Hulett | Nov. 11, 1952 |
| 2,618,904 | Gartner | Nov. 25, 1952 |
| 2,624,641 | Smith | Jan. 6, 1953 |
| 2,637,144 | Gardner et al. | May 5, 1953 |
| 2,760,679 | Chadderton et al. | Aug. 28, 1956 |
| 2,778,691 | Hazel | Jan. 22, 1957 |
| 2,843,271 | Petro | July 15, 1958 |
| 2,879,918 | Zubal | Mar. 31, 1959 |